United States Patent [19]

Spengler et al.

[11] 4,113,931

[45] Sep. 12, 1978

[54] PROCESS FOR THE CONTINUOUS PRODUCTION OF INDENE RESINS

[75] Inventors: Hans Spengler, Henrichenburg; Günter Bucksch, Duisburg; Manfred Morgenstern, Castrop-Rauxel, all of Germany

[73] Assignee: Rutgerswerke Aktiengesellschaft, Frankfurt am Main, Germany

[21] Appl. No.: 704,600

[22] Filed: Jul. 12, 1976

Related U.S. Application Data

[63] Continuation-in-part of Ser. No. 488,092, Jul. 12, 1974, abandoned.

[30] Foreign Application Priority Data

Jul. 14, 1973 [DE] Fed. Rep. of Germany ....... 2335891

[51] Int. Cl.$^2$ ............................................. C08F 244/00
[52] U.S. Cl. .......................................... 526/64; 526/72; 526/209; 526/290; 528/500; 528/501
[58] Field of Search .................................. 526/64, 290

[56] References Cited

U.S. PATENT DOCUMENTS

| 2,287,535 | 6/1942 | Powers | 526/290 |
| 2,565,222 | 8/1951 | Geiger | 526/290 |
| 3,709,854 | 1/1973 | Hepworth et al. | 526/290 |
| 3,876,575 | 4/1975 | Hayashi et al. | 526/290 |

*Primary Examiner*—Harry Wong, Jr.
*Attorney, Agent, or Firm*—Beveridge, DeGrandi, Kline & Lunsford

[57] ABSTRACT

A process for the continuous production of indene resins comprising the steps of continuously pre-heating an indene-containing hydrocarbon mixture, continuously adding a boron trifluoride-adduct catalyst and the pre-heated indene-containing mixture to a reaction tube, continuously isothermally reacting the indene-containing mixture with the catalyst at the temperature of the pre-heated mixture to form an indene-containing resin, continuously decomposing the catalyst, and continuously separating the indene-containing resin from the decomposed catalyst and unreacted substances.

33 Claims, 1 Drawing Figure

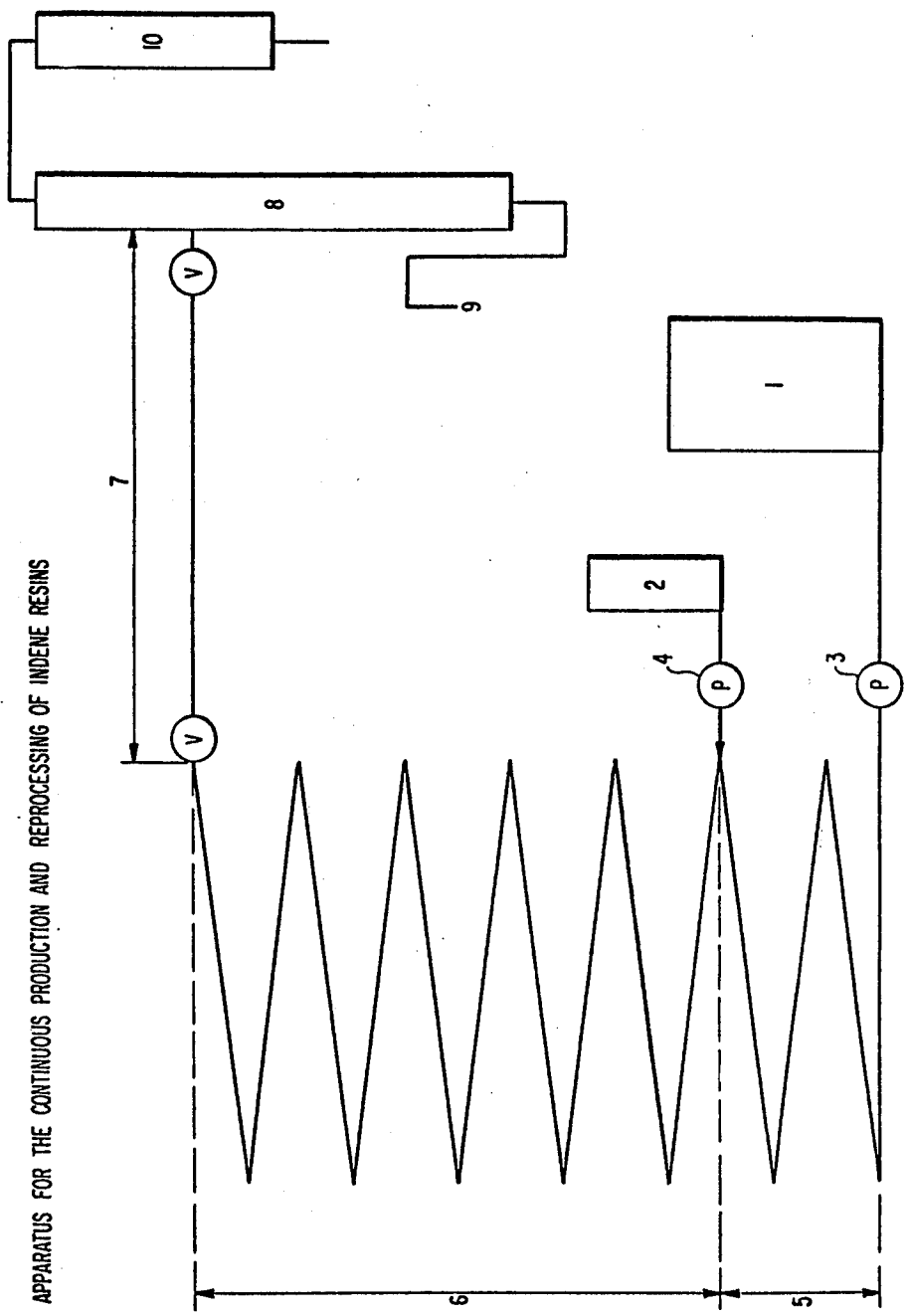

PROCESS FOR THE CONTINUOUS PRODUCTION OF INDENE RESINS

CROSS-REFERENCE TO RELATED APPLICATION

This application is a continuation-in-part of application Ser. No. 488,092, filed July 12, 1974 now abandoned, the entire disclosure of which is relied upon and incorporated herein by reference.

BACKGROUND OF THE INVENTION

The present invention is directed to a process for the continuous production of indene resins. Indene resins can be produced by polymerization of suitable fractions of tar or petro origin with a cationic initiator, such as boron trifluoride or boron trifluoride adducts. Indene-containing hydrocarbon fractions may also be obtained by fractional distillation of water-gas tar and oil-gas tar. In addition to indene, these hydrocarbon fractions may contain coumarone, methyl indene, methyl styrene, styrene, cyclopentadiene, and related compounds. These indene-containing hydrocarbon fractions are polymerized by the addition of acid, presumably to linear polymers. These polymers are generally low in molecular weight (about 1,000 or below) and are fluid above their melting points. The polymers are widely used in surface coatings, printing inks, adhesives, waxed papers, and floor tiles, and as softeners and tackifiers in the rubber industry. See for example "Textbook of Polymer Science", Second Edition by Fred W. Billmeyer, Jr., (Wiley-Interscience 1971), which is hereby incorporated by reference.

While the production of indene resins is known in the art, processes for their production are usually conducted on a discontinuous basis. When a continuous process is desired, the use of a reaction vessel equipped with an agitator has been proposed (cf. German published application No. 1,470,451 and U.S. Pat. No. 2,565,222). These processes have not proven entirely satisfactory because only resins in a narrow softening point range can be produced and conversions are unsatisfactory.

With most of the continuous processes for the polymerization of indene-containing hydrocarbon fractions, reprocessing of the polymerizate (i.e., separation of the catalyst and the solvent from the indene-containing resin) has taken place discontinuously so that the advantages of the continuous polymerization step have never been fully realized. For example, German published application No. 1,470,451 and U.S. Pat. No. 2,565,222 (which are both hereby incorporated by reference) disclose processes in which the separation of the catalyst after polymerization is carried out with adsorbents, such as clay or diatomaceous earth. Clearly, the processes described in these references have the inherent disadvantage that the adsorption medium is eventually exhausted and must be regenerated or changed. When the adsorption medium is changed or regenerated the production of indene-containing resins must be temporarily halted. Hence, it may be seen that the processes of the prior art have taken place discontinuously.

In contrast to the prior art, the present invention is directed to a continuous process for the production of indene resins comprising a series of continuous steps. Because there are no discontinuities in the process of the present invention, the advantages of the continuous polymerization of indene-containing hydrocarbon fractions are fully realized.

As those skilled in the art are aware, the quality of indene resins is determined by the brightness, the softening point and the acid number of the resin. It is desirable that the brightness values lie within the range of 0.5 to 2.0 Barrett (hereafter abbreviated B 0.5 to B 2.0). It is further desirable that the acid numbers of the indene polymers be low, preferably below 0.05. The softening points of the indene resins desired will depend on the intended use of the resins. The prior art is capable only of producing resins in a narrow range of softening points. By contrast, the present invention permits the production of bright indene resins over a wide range of softening points. The softening point of the indene resin produced will depend upon the reaction parameters, and in particular upon the polymerization temperature.

It is therefore a primary object and purpose of the invention to provide a continuous process for the production of indene resins comprising a series of continuous steps.

Another object of the invention is to provide a continuous process for the production of indene resins including continuous separation of the indene resin produced from the catalyst and unreacted hydrocarbon-containing mixture.

Still another object of the invention is to provide a continuous process for the production of very bright indene resins having a softening point range between 0° C. and 170° C. KS (i.e., Kraemer-Sarnow) with very low catalyst consumption.

A further object of the invention is to provide a continuous process for the production of indene resins with brightness values and acid numbers which are more favorable than those which can be obtained by the prior art.

It is another object of this invention to provide a continuous process for the production of indene resins utilizing a relatively short reaction time and yet obtain a high yield of resin.

Other objects and advantages of the invention will become apparent from the detailed description which follows.

The indene polymers produced by the process of the present invention can be used for many of the purposes discussed. As those skilled in the art are aware, the utility to which an indene resin is applied will depend upon the softening range of the resin as well as its brightness value and acid number.

SUMMARY OF THE INVENTION

This invention fulfills the above-mentioned objects as well as overcoming the aforementioned disadvantages by providing a continuous process for the production of an indene-containing resin. The process of this invention comprises preheating an indene-containing hydrocarbon fraction to a reaction temperature of about 20° C. to about 180° C. A boron trifluoride-containing catalyst and the preheated indene-containing fraction are then continuously fed into a reaction tube which is maintained at the reaction temperature. The catalyst is in an amount between about 0.03 and about 0.4% by weight, related to the weight of the indene-containing hydrocarbon fraction. The indene-containing hydrocarbon fraction and catalyst are then continuously reacted in the reaction tube at a pressure between about 0 and about 8 atmospheres for a period of from 3.84 minutes to 35.89 minutes to form an indene resin. The catalyst is decomposed by contacting the mixture of the indene resin and any reacted hydrocarbon fraction with steam at about 0.5 to about 6 atmospheres of pressure. The indene resin can then be separated from the decomposed catalyst and any unreacted hydrocarbon fraction.

BRIEF DESCRIPTION OF THE DRAWING

The FIGURE is a schematic illustration of typical apparatus employed in this invention for continuously producing and reprocessing indene-containing resins.

With respect to the FIGURE, 1 represents a quantity of starting material, i.e., an indene-containing hydrocarbon fraction, which of course can be continuously replenished. 2 represents a quantity of catalyst, such as a boron trifluoride-adduct, which can also be continuously replenished. Pumps 3 and 4 force starting material and catalyst, respectively, into a reaction system. The starting material 1 is preheated to the desired reaction temperature in a preheating zone 5. Catalyst 2 is mixed with the preheated indene-containing hydrocarbon starting material 1 in reaction tube 6. The polymerization reaction to form an indene-containing resin then takes place in the reaction tube 6. The catalyst is continuously decomposed in a catalyst decomposition zone 7 after the polymerization reaction. The indene-containing resin can be continuously separated from the decomposed catalyst and unreacted hydrocarbon fraction in a distillation column 8. 9 represents the sump of the distillation column from which the indene-containing resin is obtained. Decomposed catalyst and unreacted hydrocarbon fractions are drawn off at the head of the distillation column 8 via a condenser 10.

DETAILED DESCRIPTION

The process of this invention is applicable to any indene-containing hydrocarbon fraction including any crude or refined fraction comprising, in addition to indene, other unsaturated hydrocarbons such as vinyl toluene, coumarone, methyl styrene, styrene, cyclopentadiene and related compounds. The indene-containing hydrocarbon fraction employed as starting material in the process of the present invention preferably has a boiling range from about 100° C. to about 220° C. and contains about 20% to about 70% by weight unsaturated hydrocarbons.

The production of indene-containing resins of the desired polymer size having uniform physical characteristics, particularly the Kraemer-Sarnow softening point, is primarily effected by an accurate control of the selected polymerization temperature. The Kraemer-Sarnow softening point of the resin produced is found to decrease with increasing reaction temperature. In the process according to this invention, the indene-containing hydrocarbon fraction is preheated to a reaction temperature of about 20° C. to about 180° C. This preheating can be accomplished by heating the indene-containing hydrocarbon fraction for about 0.1 min to about 1 min, preferably about 0.4 min, and at a pressure of about 2 bar to about 21 bar, preferably about 6 bar. Typical of the types of apparatus that can be employed for this purpose is a jacketed tube heat exchanger, heat exchanger comprising parallel tubes, or a plate-type exchanger.

The catalyst employed in the process of this invention is a boron trifluoride-containing catalyst. As those skilled in the art are aware, boron trifluoride is one of the most avid electron acceptors- that is, strongest Lewis acids- known, and readily unites with water, ethers, alcohols, amines, phosphines, etc., to form adducts. The preferred catalysts are selected from the group consisting of boron trifluoride-phenolate and boron trifluoride-dimethyl etherate. In the case of boron trifluoride-phenolate, a particularly preferred catalyst contains one part by weight boron trifluoride and two parts by weight phenol. In the case of boron trifluoride-dimethyl etherate, a particularly preferred catalyst contains one part by weight boron trifluoride and one part by weight dimethyl ether. It has surprisingly been found that the amount of catalyst required in practicing the process of this invention can be quite low. More particularly, the amount of catalyst employed in this invention need only be about 0.03 to about 0.4% by weight, related to the weight of the indene-containing hydrocarbon fraction. Even with such small quantities of catalyst it is still possible to attain yields of about 96% to about 100% related to weight of resinifiable material.

It is an essential characteristic of the present invention that the preheated indene-containing hydrocarbon fraction and catalyst be continuously fed to a reaction tube, which is maintained at the reaction temperature of about 20° C. to about 180° C. and a pressure of up to about 8 atmospheres. The higher pressures make it possible to employ the higher reaction temperatures, which as noted above, make it possible to prepare resins having lower softening points. The catalytic polymerization of the indene-containing hydrocarbon fraction is an exothermic reaction. Isothermal reaction conditions can be maintained by externally cooling the reaction tube. The reaction tube employed herein is considerably different from the well-known polymerization vessel provided with agitator means. In the reaction tube employed in the process of this invention, the length of the reaction tube is several orders of magnitude greater (i.e., at least about $10^3$ times greater) than the diameter or major cross-sectional dimension of the tube. For example, the length of the tube will generally be about 100 m to about 600 m, preferably about 323.2 m. The cross-sectional area of the reaction tube will usually be about 707 mm² to about 7854 mm², preferably about 2043 mm². Thus, it can be seen that the length of the reaction tube is much larger than the major cross-sectional dimension.

The flow characteristics of the reactants through the reaction tube can be either turbulent or laminar flow. The flow rate of reactants under pressure through the reaction tube is about 1.5 to about 10 m³/hr, preferably about 3 m³/hr. The reaction tube can be provided with external cooling means in order to maintain isothermal reaction conditions. In the case of a jacketed reaction tube, the heat of reaction can be removed by water or oil circulating through the jacket.

It is another essential feature of the present invention that the reaction time in the reaction tube be between 3.84 min. and 35.89 min. Even with such relatively short reaction times, it is possible to attain yields of about 96% to about 100%, related to weight of resinifiable material.

Upon the substantial completion of the polymerization reaction in the reaction tube whereby the indene resin is formed, it is essential that the catalyst be continuously decomposed and the indene resin continuously separated from the decomposed catalyst and unreacted hydrocarbon fraction. Catalyst decomposition is effected by contacting the mixture of resin, catalyst and unreacted hydrocarbon fraction from the reaction tube with steam at a pressure of about 0.5 to about 6 atmospheres in a series connected catalyst decomposition zone for a period of time sufficient to decompose substantially all of the catalyst. The catalyst decomposition zone can typically be operated at a temperature of about 120° C. to about 180° C., preferably about 150° C. The quantity of steam employed in the catalyst decomposition zone is typically about 4 to about 15 weight percent, preferably about 6 weight percent, related to quantity of the mixture being treated. The decomposition of the catalyst can conveniently be carried out in a steam-traced pipe or a jacketed barrel. The preferred residence time for the mixture in the catalyst decomposition zone is about 20 to about 40 seconds.

The polymerizate leaving the catalyst decomposition zone is separated from the decomposed catalyst and unreacted hydrocarbon fraction. This is preferably accomplished by distillation, especially by flashing the mixture from the decomposition zone into a distillation column where the indene resin can be separated from boric acid, hydrogen fluoride, water and the main quantity of non-resinifiable components.

The continuous separation of the catalyst from the reaction mixture not only permits one to realize the advantages of a continuous polymerization process, but also permits the production of resins having brightness values and acid numbers, which are more favorable than those obtainable with conventional methods of operation.

This invention will be described in greater detail in the following Examples in which all parts, proportions, percentages and ratios are by weight unless otherwise indicated. The term "atmospheres" means superatmospheric pressure. Unless as otherwise indicated, the reaction parameters employed in each Example were the same as the aforementioned preferred conditions. Reprocessing the resin with water vapor or steam as mentioned in Examples 1 and 4 means removing the unreacted products and monomers by steam distillation.

The same experimental apparatus was employed in each of the Examples. The reaction tube had a length of 330 meters and a diameter of 51 mm. In Examples 1, 2 and 3, the flow rate through the reaction tube was 16 kg/hr. In Examples 4 and 5, the flow rate through the reaction tube was 11 kg/hr.

In Examples 1 and 4 only the resinifiable components of the indene-containing hydrocarbon fraction are stated. The remaining substances are non-resinifiable BTX-shares (Arsol III N, 170° C. <boiling range < 200° C.).

| EX. | RESINIFIABLE WT % | NON-RESINIFIABLE WT % |
| --- | --- | --- |
| 1 | 59.3 | 40.7 |
| 4 | 68.5 | 31.5 |

Any saturated hydrocarbon in the boiling range between 140° C. and 240° C. can be employed as a solvent. More particularly, following are approximate analyses.

| ANALYSIS | EXAMPLE 1 WT % | EXAMPLE 2 WT % | REMARKS |
| --- | --- | --- | --- |
| mp xylene | approx. 1.1 | 0.7 | |
| cumene | approx. 2.7 | — | |
| o xylene | approx. 2.3 | 2.9 | |
| mp ethyl toluene | approx. 2.9 | 5.6 | |
| mesitylene | approx. 7.2 | 8.2 | |
| styrene | approx. 1.4 | — | |
| pseudocumene | approx. 7.4 | — | |
| α-methyl styrene | 2.1 | — | resinifiable |
| hemellitol | approx. 1.3 | 8.2 | |
| vinyl toluene | — | 32.0 | resinifiable |
| hydrindene | approx. 9.4 | 4.6 | |
| methyl indene | 1.7 | 2.5 | resinifiable |
| indene | 52.0 | 26.0 | resinifiable |
| cumarone | 3.5 | — | |
| benzonitrile | approx. 2.6 | — | |
| acetophenone | approx. 0.2 | — | |
| dicyclopentadiene | — | 8.0 | resinifiable |
| unknowns | approx. 1.0 | 1.3 | |
| | 100 % | 100 % | |

The analyses of the saturated hydrocarbons fluctuate depending on the initial tar and intermediate processing.

EXAMPLE 1

A hydrocarbon stream is preheated to 50° C., which contains 52% polymerizable indene, 3.5% coumarone, 1.7% methyl indene and 2.1% α-methyl styrene. The preheated stream is pumped into a reaction tube at a pressure of 4 atmospheres. A catalyst, 0.4% by weight of $BF_3$-phenolate, $BF_3 (HOC_6H_5)_2$, (related to the hydrocarbon fraction) is sprayed into the reaction tube.

After a reaction time of 350 seconds, the stream of hydrocarbon leaves the reactor. Thereafter in a pipe connected in series, 15% by weight of steam are sprayed by nozzle into the polymerizate at a pressure of 2 atmospheres and after a reaction time of 30 seconds, the steam-polymerizate mixture is expanded into a distillation column, whereby $B(OH)_3$, HF, all the water and 20 to 30% of non-resinifiable substances are drawn off at the head of the distillation column.

In the sump of the distillation column, a polymerizate comprising an indene resin with an acid number between 0.08 and 0.25 is obtained. After reprocessing with water vapor, a resin with the following characteristics is obtained at a yield of 98%:

Softening point (Kraemer-Sarnow) 112° C.
Brightness B 0.5
Acid number below 0.05
Bromide number 22.

EXAMPLE 2

Preheating a hydrocarbon stream at a temperature of 100° C. and under otherwise the same conditions as stated in Example 1, one will obtain a resin with the following characteristics:

Softening point 60° C. (KS)
Brightness B 0.5
Acid number below 0.05
Bromide number 36.

EXAMPLE 3

Preheating a hydrocarbon stream to a temperature of 140° C., using a catalyst quantity of 0.15% by weight $BF_3$-phenolate and otherwise under the same reaction conditions as in Example 1, one will obtain a 98% yield resin having the following characteristics:

Softening point 10° C. (KS)
Brightness B 0.5
Acid number below 0.05
Bromide number 42.

EXAMPLE 4

0.3% by weight of BF$_3$-phenolate are sprayed through a nozzle into a hydrocarbon stream which contains as polymerizable substances 32% vinyl toluene, 8% dicyclopentadiene, 26% indenes, 2.5% methyl indene, and which is pumped into a reaction tube at a pressure of 3 atmospheres at a temperature of 20° C.

After a reaction time of 500 seconds, the polymer-containing hydrocarbon stream leaves the reactor. 15% by weight of steam is sprayed through a nozzle into the polymerizate in a pipe connected in series at a pressure of 1 atmosphere, and after a reaction time of 30 seconds the steam-polymerizate mixture is expanded into a distillation column.

In the sump of the distillation column a polymerizate having an acid number between 0.1 and 0.2 is obtained.

After reprocessing with steam, a resin having the following characteristics is obtained:
Softening point 95° C. (KS)
Brightness B 1.5
Acid number below 0.05
Bromide number 37.

EXAMPLE 5

When 0.25% by weight of BF$_3$-dimethyl etherate (1:1) is sprayed through a nozzle into the hydrocarbon stream and otherwise under the same reaction conditions as stated in Example 1, a 96% yield of a resin having the following characteristics is obtained:
Softening point 90° C. (KS)
Brightness B 1
Acid number below 0.05
Bromide number 26.

It is understood that various other modifications will be apparent to and can be readily made by those skilled in the art without departing from the scope and spirit of this invention. Accordingly, it is not intended that the scope of the claims appended hereto be limited to the description set forth herein but rather that the claims be construed as encompassing all the features of patentable novelty which reside in the present invention including all features which would be treated as equivalents thereof by those skilled in the art to which this invention pertains.

The practice of this invention is accompanied by a number of advantages among which are the following. This invention makes it possible to prepare very bright indene resins having a broad range of softening points, i.e., about 0° C. to about 170° C. KS, and low acid numbers, i.e., below 0.05. This invention makes it possible to prepare indene resins in a continuous process and without the catalyst adsorbents of the prior art, which must be regenerated. Very high yields of indene resin are possible even though relatively short reaction times are employed and even though catalyst consumption is very low. The novel combination of preheating of reactants, use of a reaction tube, use of a small amount of catalyst, use of short reaction times, and decomposition of the catalyst with stream makes it possible to prepare very bright indene resins having a broad softening point range and low acid values at high yields on a continuous basis.

What is claimed is:

1. A continuous process for the production of an indene resin, said process comprising the following sequential steps:

(A) preheating an indene-containing hydrocarbon fraction to a reaction temperature of about 20° C. to about 180° C.;

(B) continuously feeding said preheated indene-containing hydrocarbon fraction and a boron trifluoride-containing catalyst into a reaction tube which is maintained at said reaction temperature, wherein said catalyst is in an amount between about 0.03 and about 0.4% by weight catalyst, related to the weight of said indene-containing fraction; and wherein said reaction tube has a length which is at least about 10$^3$ times greater than the major cross-sectional dimension of said reaction tube;

(C) continuously reacting said indene-containing hydrocarbon fraction and said catalyst in said reaction tube at a pressure between about 0 and about 8 atmospheres for a period of from about 3.84 min. to about 35.89 min. to form an indene resin;

(D) contacting said mixture of said resin, catalyst and unreacted hydrocarbon fraction with steam at about 0.5 to about 6 atmospheres of pressure in order to decompose said catalyst; and (E) separating said indene resin from said decomposed catalyst and unreacted hydrocarbon fraction.

2. Process according to claim 1 wherein said indene resin has a softening point between about 0° C. and about 170° C. KS.

3. Process according to claim 2 wherein said indene resin has a brightness value of about B 0.5 to about B 2.0.

4. Process according to claim 3 wherein said indene resin has an acid number below about 0.05.

5. Process according to claim 1 wherein said indene-containing hydrocarbon fraction comprises an indene-containing mixture of unsaturated hydrocarbons having a boiling range between about 100° C. and about 220° C.

6. Process according to claim 5 wherein said indene-containing hydrocarbon fraction comprises about 20% to about 70% unsaturated hydrocarbons.

7. Process according to claim 1 wherein said catalyst is a boron trifluoride adduct.

8. Process according to claim 7 wherein said boron trifluoride-adduct catalyst is selected from the group consisting of boron trifluoride-phenolate (1:2 weight ratio), and boron trifluoride-dimethyl etherate (1:1 weight ratio).

9. Process according to claim 1 wherein said reaction is conducted under substantially isothermal reaction conditions by external cooling of said reaction tube.

10. Process according to claim 1 wherein, after said decomposing of said catalyst, the resulting mixture is flash distilled, whereby boric acid, hydrogen fluoride, water and substantially all non-resinifiable substances are separated from said indene resin.

11. Process according to claim 1 wherein said mixture of said resin, catalyst and unreacted hydrocarbon fraction is contacted with said steam for about 20 to about 40 seconds.

12. A continuous process for the production of an indene resin having a softening point between about 0° C. and about 170° C. KS, a brightness value of about B 0.5 to about B 2.0, and an acid number below about 0.05, said process comprising the following sequential steps:

(A) preheating an indene-containing hydrocarbon fraction to a reaction temperature of about 20° C. to about 180° C.;

(B) continuously feeding about 1.5 to about 10 m³/hr of said preheated indene-containing hydrocarbon fraction and a boron trifluoride-adduct catalyst into a reaction tube which is maintained at said reaction temperature; wherein said catalyst is in an amount between about 0.03 and about 0.4% by weight catalyst, related to the weight of said indene-containing fraction; and wherein said reaction tube has a length which is at least about 10³ times greater than the major cross-sectional dimension of said reaction tube;

(C) continuously reacting said indene-containing hydrocarbon fraction and said catalyst in said reaction tube at a pressure between about 0 and about 8 atmospheres for a period of from about 3.84 min. to 35.89 min. to about form an indene resin;

(D) contacting said mixture of said resin, catalyst and unreacted hydrocarbon fraction with steam at about 0.5 to about 6 atmospheres of pressure for a period of time sufficient to decompose said catalyst; and (E) separating said indene resin from said decomposed catalyst and unreacted hydrocarbon fraction.

13. Process according to claim 12 wherein said boron trifluoride-adduct catalyst is selected from the group consisting of boron tifluoride-phenolate (1:2 weight ratio), and boron trifluoride-dimethyl etherate (1:1 weight ratio).

14. Process according to claim 12 wherein said reaction is conducted under substantially isothermal reaction conditions by external cooling of said reaction tube.

15. Process according to claim 12 wherein, after said decomposing of said catalyst, the resulting mixture is flash distilled, whereby boric acid, hydrogen fluoride, water and substantially all non-resinifiable substances are separated from said indene resin.

16. Process according to claim 12 wherein said mixture of said resin, catalyst and unreacted hydrocarbon fraction is contacted with said steam for about 20 to about 40 seconds.

17. Process according to claim 12 wherein said length of said reaction tube is about 100 to about 600 m, and said reaction tube has a cross-sectional area of about 707 to about 7854 mm².

18. Process according to claim 17 wherein said preheating is conducted at a pressure of about 2 to about 21 bar for a time of about 0.1 to about 1 minute.

19. Process according to claim 17 wherein said mixture is contacted with said steam at about 120° C. to about 180° C. for about 20 to about 40 seconds, and said steam is employed in an amount of about 4 to about 15 weight percent, related to the quantity of said mixture.

20. A continuous process for the production of an indene resin, said process comprising the following sequential steps:
(A) preheating an indene-containing hydrocarbon fraction to a reaction temperature of about 20° C. to about 180° C.;
(B) continuously feeding about 1.5 to about 10³/hr of said preheated indene-containing hydrocarbon fraction and a boron trifluoride-containing catalyst into a reaction tube which is maintained at said reaction temperature; wherein said catalyst is in an amount between about 0.03 and about 0.4% by weight catalyst, related to the weight of said indene-containing fraction; and wherein said reaction tube has a length which is at least about 10³ times greater than the major cross-sectional dimension of said reaction tube;

(C) continuously reacting said indene-containing hydrocarbon fraction and said catalyst in said reaction tube at a pressure between about 0 and about 8 atmospheres for a period of from about 3.84 min. to about 35.89 min. to form an indene resin;

(D) contacting said mixture of said resin, catalyst and unreacted hydrocarbon fraction with steam at about 0.5 to about 6 atmospheres of pressure in order to decompose said catalyst; and (E) separating said indene resin from said decomposed catalyst and unreacted hydrocarbon fraction.

21. Process according to claim 20 wherein said boron trifluoride-containing catalyst is selected from the group consisting of boron trifluoride-phenolate (1:2 weight ratio), and boron trifluoride-dimethyl etherate (1:1 weight ratio).

22. Process according to claim 20 wherein said reaction is conducted under substantially isothermal reaction conditions by external cooling of said reaction tube.

23. Process according to claim 20 wherein said length of said reaction tube is about 100 to 600 m, and said reaction tube has a cross-sectional area of about 707 to about 7854 mm².

24. Process according to claim 23 wherein said preheating is conducted at a pressure of about 2 to about 21 bar for a time of about 0.1 to about 1 minute.

25. Process according to claim 20 wherein said indene resin has a softening point between about 0° C. to about 170° C. KS.

26. Process according to claim 25 wherein said indene resin has a brightness value of about B 0.5 to about B 2.0.

27. Process according to claim 26 wherein said indene resin has an acid number below about 0.05.

28. Process according to claim 20 wherein said indene-containing hydrocarbon fraction comprises an indene-containing mixture of unsaturated hydrocarbons having a boiling range between about 100° C. and about 220° C.

29. Process according to claim 28 wherein said indene-containing hydrocarbon fraction comprises about 20% to about 70% unsaturated hydrocarbons.

30. Process according to claim 20 wherein said catalyst is a boron trifluoride-containing catalyst.

31. Process according to claim 30 wherein said boron trifluoride-containing catalyst is selected from the group consisting of boron trifluoride-phenolate (1:2 weight ratio), and boron trifluoride-dimethyl etherate (1:1 weight ratio).

32. Process according to claim 20 wherein, after said decomposing of said catalyst, the resulting mixture is flash distilled, whereby boric acid, hydrogen fluoride, water and substantially all non-resinifiable substances are separated from said indene resin.

33. Process according to claim 20 wherein said mixture of said resin, catalyst and unreacted hydrocarbon fraction is contacted with said steam for about 20 to about 40 seconds.

* * * * *